April 11, 1967 V. CASINI 3,313,267
INDICATOR DEVICE
Filed Feb. 25, 1965 2 Sheets-Sheet 1

United States Patent Office 3,313,267
Patented Apr. 11, 1967

3,313,267
INDICATOR DEVICE
Vittorio Casini, Pisa, Italy, assignor to Piaggio & C. S.p.A., Genoa, Italy, a company of Italy
Filed Feb. 25, 1965, Ser. No. 435,284
Claims priority, application Italy, Mar. 3, 1964, 716,481/64
4 Claims. (Cl. 116—116)

The invention relates to a linear indicator, particularly to a tachometric indicator for motorcars and motor vehicles, with a color band progressing along a slot of a dial.

It is an object of the invention mainly to provide an extremely simple construction and to make it possible to obtain such an instrument by utilizing a standard pointer instrument without the need for any additional elements.

The indicator according to the invention is thus characterized in that the color band visible through the slot of the dial is confined by an index constituted by the border of a plane colored element lying in a plane underlying and parallel to the plane of the dial and rotatable around an axis normal to said planes.

One particularly advantageous embodiment of the invention provides the profile of said plane element, in its portion visible through the straight slot of the dial during the rotation of said element, to be formed by one or more arcs of an involute. In this case one obtains that the end of the color band always remains normal to the progressing direction of said band along the straight slot of the dial and that the progressing of the color band is proportional to the angular displacement of the plane element around its axis of rotation. Consequently, the straight slot of the dial may be equipped with a uniform graduated scale.

The invention will be described more fully hereinafter with reference to the accompanying drawings which diagrammatically represent by way of example some embodiments of the indicator in the shape of tachometric indicators.

Figure 1:
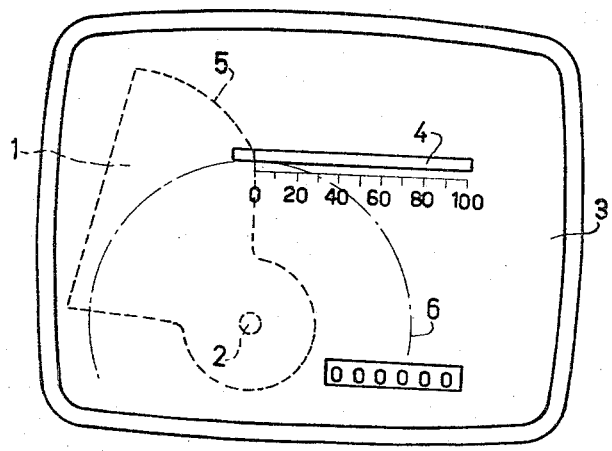
FIG. 1 is a front view of the indicator with an index constituted by only one arc of involute.
Figure 2:
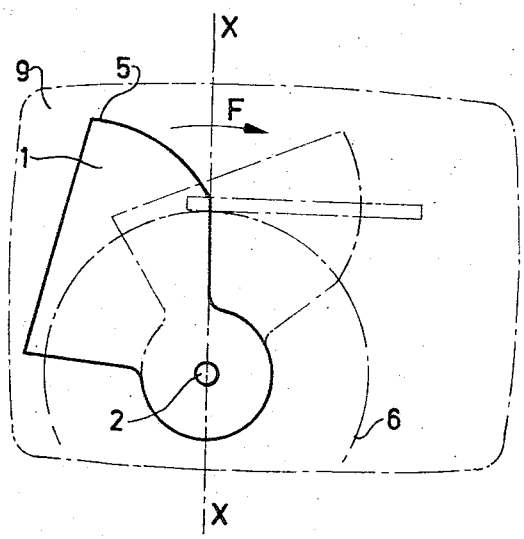
FIG. 2 represents the indicator of FIG. 1 with the dial outlined in dash-and-dot lines and with the plane element in view in two positions.

The tachometric indicator represented in FIGS. 1 and 2 is constituted by a dial 3 with a straight slot 4 in its upper portion and by colored plane element 1 fixed at the end of a shaft 2 constituting the shaft of a standard tachometric instrument known per se and not illustrated. The element 1, therefore, turns together with the shaft 2 the axis of which is normal to the plane of the dial and to that of the underlying element 1. The bottom plane underlying the element 1 is indicated by 9.

The border 5 of the element 1 as visible through the slot 4 of the dial 3 possesses a profile formed by an arc of an involute of the circle of basis 6 with a center coaxial with the axis of the shaft 2.

The lower border of the slot 4 is tangent to the basic circle 6.

The starting position of the element 1 is such that its involute-shaped boder 5 is tangent to the plane, marked by its trace X—X, passing through the axis of the shaft 2 and normal to the slot 4. When the element 1 turns together with the shaft 2 in the direction of the arrow F, the apparent intersection of its border 5 with the straight slot 4 lying in the plane tangent to the basis circle 6 of the involute, shifts—due to the known properties of the involute—proportionally to the angle of rotation of the element 1 always remaining normal to the slot 4.

In that way, if the plane element 1 has a color (for instance red) different from that (for instance white) of the bottom plane 9, a color band (red in the cited example) appears to progress proportionally to the angular displacement of the index constituted by the border 5 along the slot 4. The latter, therefore, can be graduated uniformly as shown in FIG. 1.

Figure 3:
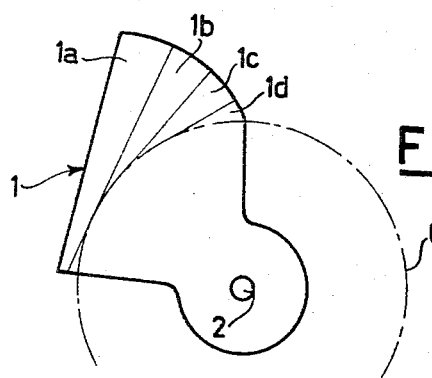
FIG. 3 shows in front view only the plane element which may be a particular color.

In a particular embodiment, illustrated in FIG. 3, the element 1 may be colored differently by sectors tangent to the basis circle 6. In the example shown on the element 1 there are provided four sectors 1a, 1b, 1c, 1d of different colors or tonalities. During the rotation of the element 1, therefore, one obtains in addition to a progress of the indicating band in the slot 4 also integral change of color according to the color or shade foreseen for the different sectors in such a way that for every value of the magnitude measured there corresponds a determined shade of color.

Figure 4:
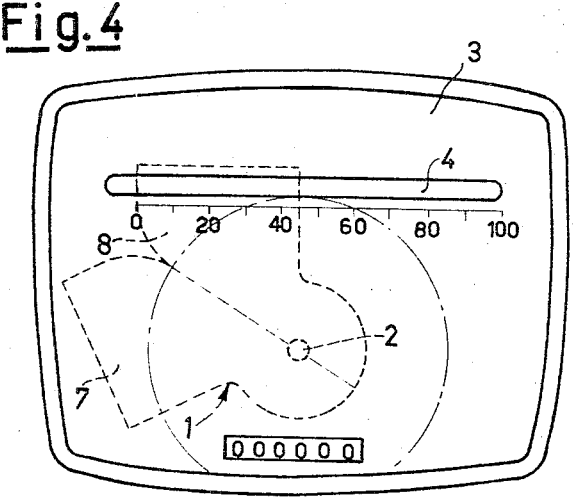
FIG. 4 is a front view of another embodiment of an indicator according to the invention, of symmetrical shape and arrangement and with an index constituted by two arcs of an involute forming the border of the plane element.
Figure 5:
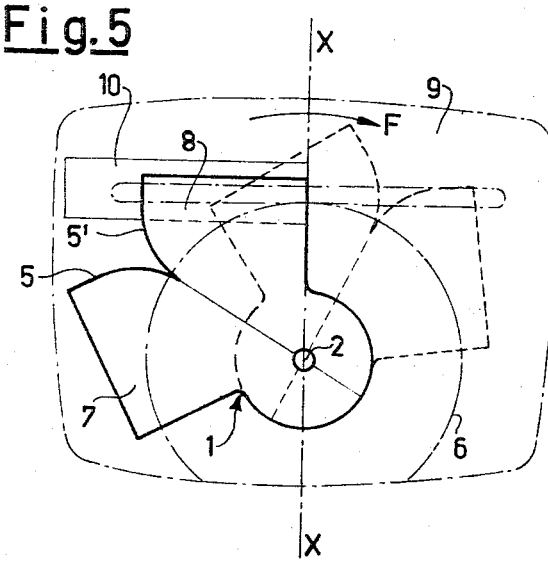
FIG. 5 illustrates the indicater of FIG. 4 with the dial removed and with the plane element in view in two positions.

In FIGURES 4 and 5 there is represented a second embodiment of the indicator according to the invention. Also in this case the dial 3 has a straight slot 4 located accurately at the middle in the upper portion of said dial. Between the bottom plane 9 and the plane of the dial there is arranged the plane element 1 fixed at the end of the shaft 2 the axis of which is normal to the plane of the dial and is disposed on the line X—X contained in the middle plane of the dial.

The plane element 1 has a symmetrical shape and has two contiguous borders 5 and 5' each of which has an involute-shaped profile with opposed curvature centers. The top surface of the element 1 is divided into two zones 7 and 8 of different color, for instance a red zone 7 and a white zone 8. The base circle 6 of the two involutes (borders 5 and 5') is tangent to the lower border of the slot 4 ind its center coincides with the axis of the shaft 2. The bottom plane 9 is divided into two zones of different color, namely of the same colors of the zones 7 and 8 of the element 1.

In the case illustrated, the plane 9 is white (corresponding to the zone 8 of element 1) and a zone 10 of the bottom underlying the slot 4 of the dial 3 is red (corresponding to the zone 7 of the element 1).

In this way, in the starting position of the element 1 (indicated by solid lines in FIG. 5) its white zone 8 substantially covers entirely the red zone 10 of the bottom, underlying the slot 4, and the border 5' initially constitutes the index. During the initial rotation of the element 1 rigid with the shaft 2 the border 5' uncovers gradually the red zone 10 of the bottom and one gets the impression of progressive advancement of a red band along the slot 4. When the element 1 finds itself in the position in which the index has attained the middle line of the slot 4 provided with the graduated scale, the function of the index is transferred from the border 5' to the border 5 of the red zone 7 of the element 1. During the further rotation of the element 1 the progress of the red band advancing along the slot 4 is ensured by the red zone 7 of the element 1.

This embodiment of the indicator is particularly suited for reasons of symmetry to be applied as a tachometer mounted at the center of the handle bar of a motor vehicle.

The orientation of the slot of the dial instead of being horizontal might be otherwise for instance vertical or inclined. The graduation might be provided on the border of the plane element in lieu of on the dial. The plane element might rotate in a direction contrary to that indicated in the figures and the element might be made in any manner, of metal, plastics or other material, integrally by moulding or by casting. Moreover it is possible to provide a counterweight for the plane element.

In the case in which the border of the plane element constituting the index possesses a shape different from an arc of an involute, which shape in the limit-case might even be rectilinear, obviously there are not attained the mentioned advantages of the index being normal to the direction of the graduated scale and of the latter being uniform.

I claim:

1. An indicator device comprising first and second planar elements in spaced relation, said first element having a slot through which the said second element is visible, said second element having first and second zones, each of said zones having a distinctive appearance, the first zone extending over a first portion of the length of the slot, the second zone extending over a second portion of the length of the slot, rotatable indicator means mounted between said elements, means supporting the indicator means for rotation, said indicator means including a first portion having an appearance corresponding to that of said second zone and covering said first zone in an initial position of the indicator means, said indicator means further including a second portion having an appearance corresponding to that of said first zone, said first and second portions being arranged so that said first portion uncovers said first zone as the indicator means undergoes a first part of rotation, after which the second portion covers the second zone whereby a band corresponding in appearance to that of the first zone appears to change length in said slot as the indicator means undergoes rotation.

2. An indicator device as claimed in claim 1 wherein said first portion of the indicator means has a trailing edge, and the second portion of the indicator device has a leading edge which are respectively shaped to maintain a perpendicular relation in the slot as the indicator means is rotated.

3. An indicator device as claimed in claim 1 wherein said slot is rectangular and has a central transverse axis, said first and second zones extending to either side of said central transverse axis, said indicator means being supported for rotation about an axis which intersects the central transverse axis of the slot.

4. An indicator device as claimed in claim 2 wherein said trailing edge of the first portion and the leading edge of the second portion are involutes of opposite curvature having a base circle with a center coinciding with the axis of rotation of the indicator means and a radius of a magnitude such that the base circle is tangent to the lower edge of the slot, said involutes being tangent at said base circle.

References Cited by the Examiner

UNITED STATES PATENTS

| | | | |
|---|---|---|---|
| 739,740 | 9/1903 | Sutton | 116—57 |
| 2,887,084 | 5/1959 | Sivacek | 116—116 |
| 3,037,476 | 6/1962 | Nallinger | 116—57 |

LOUIS J. CAPOZI, *Primary Examiner.*